(12) United States Patent
Wu et al.

(10) Patent No.: US 8,792,422 B2
(45) Date of Patent: Jul. 29, 2014

(54) TRANSFERRING METHOD, RELAY STATION AND BASE STATION FOR UPLINK FEEDBACK INFORMATION IN RELAY LINK

(75) Inventors: Shuanshuan Wu, Shenzhen (CN); Feng Bi, Shenzhen (CN); Jin Yang, Shenzhen (CN); Feng Liang, Shenzhen (CN); Ming Yuan, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 320 days.

(21) Appl. No.: 13/259,654

(22) PCT Filed: Jun. 8, 2010

(86) PCT No.: PCT/CN2010/073688
§ 371 (c)(1),
(2), (4) Date: Dec. 15, 2011

(87) PCT Pub. No.: WO2010/145481
PCT Pub. Date: Dec. 23, 2010

(65) Prior Publication Data
US 2012/0093040 A1    Apr. 19, 2012

(30) Foreign Application Priority Data
Jun. 16, 2009    (CN) .......................... 2009 1 0149077

(51) Int. Cl.
*H04W 4/00*    (2009.01)
(52) U.S. Cl.
USPC .......................................... 370/328; 370/345
(58) Field of Classification Search
USPC ......... 370/315, 326, 328, 329, 336, 338, 345, 370/401
See application file for complete search history.

(56) References Cited

U.S. PATENT DOCUMENTS

| | | | | |
|---|---|---|---|---|
| 8,483,116 B2 * | 7/2013 | Chang et al. | ................... | 370/315 |
| 8,509,162 B2 * | 8/2013 | Horn et al. | ..................... | 370/329 |
| 8,532,015 B2 * | 9/2013 | Che et al. | ....................... | 370/315 |
| 8,537,724 B2 * | 9/2013 | Love et al. | ..................... | 370/280 |

(Continued)

FOREIGN PATENT DOCUMENTS

| | | |
|---|---|---|
| CN | 101166055 | 4/2008 |
| CN | 101325487 | 12/2008 |

(Continued)

OTHER PUBLICATIONS

International Search Report for International Application No. PCT/CN2010/073688, mailed Sep. 23, 2010.

(Continued)

*Primary Examiner* — Ricky Ngo
*Assistant Examiner* — Christine Ng
(74) *Attorney, Agent, or Firm* — Pearl Cohen Zedek Latzer & Baratz LLP

(57) ABSTRACT

The present invention provides a method for transmitting relay link uplink feedback information, a relay station and a base station, and the method comprises: determining timing relationship for transmitting the uplink feedback information according to relay subframe configuration (S202); a relay station determining an uplink relay subframe for transmitting the uplink feedback information according to the timing relationship (S204), and transmitting the uplink feedback information via the uplink relay subframe (S206). The present invention ensures the reliability of downlink communication between the base station and the relay station, and the transmission of this feedback information would not cause effect on user equipment.

10 Claims, 9 Drawing Sheets

(56) References Cited

U.S. PATENT DOCUMENTS

| | | | |
|---|---|---|---|
| 2010/0103860 A1* | 4/2010 | Kim et al. | 370/315 |
| 2010/0185958 A1 | 7/2010 | Shen | |
| 2011/0170475 A1* | 7/2011 | Raaf | 370/315 |
| 2011/0211523 A1* | 9/2011 | Seo et al. | 370/315 |
| 2011/0222428 A1* | 9/2011 | Charbit et al. | 370/252 |
| 2011/0223927 A1* | 9/2011 | Seo et al. | 455/450 |
| 2011/0244787 A1* | 10/2011 | Kim et al. | 455/7 |
| 2011/0267993 A1* | 11/2011 | Seo et al. | 370/279 |

FOREIGN PATENT DOCUMENTS

| | | |
|---|---|---|
| CN | 101426178 A | 5/2009 |
| JP | 2008-048221 A | 2/2008 |
| WO | WO 2009/070964 | 6/2009 |

OTHER PUBLICATIONS

3GPP TSG RAN WG#57, R1-091989, "DL and UL Backhaul Subframe Allocation for Type 1 Relay in LTE-A.," CATT, CMCC, Potevio, San Francisco, USA, May 4-8, 2009.

3GPP TSG RAN 1 #52, RL-080738, "UL ACK/NACK for TDD," Motorola, Sorrento, Italy, Italy Feb. 11-15, 2008.

3GPP TSG RAN WG1 Meeting #51 BIS, R1-080175, "ACK/NACKS Transmission in UPPTS," CATT, Sevilla, Spain, Jan. 14-18, 2008.

Japanese Office Action for Japanese Application No. 2012-515340, Issued Oct. 1, 2013.

* cited by examiner

| 0 | 1 | 2 | 3 | 4 | 5 | 6 | 7 | 8 | 9 |
|---|---|---|---|---|---|---|---|---|---|
| D | S | U | UL-B | U | D | D | DL-B | DL-B | DL-B |

Fig.4

| 0 | 1 | 2 | 3 | 4 | 5 | 6 | 7 | 8 | 9 |
|---|---|---|---|---|---|---|---|---|---|
| D | S | U | UL-B | D | D | D | D | DL-B | DL-B |

(a)

| D | S | U | UL-B | D | D | D | DL-B | DL-B | DL-B |
|---|---|---|---|---|---|---|---|---|---|

(b)

| D | S | U | UL-B | DL-B | D | D | DL-B | DL-B | DL-B |
|---|---|---|---|---|---|---|---|---|---|

| 0 | 1 | 2 | 3 | 4 | 5 | 6 | 7 | 8 | 9 |
|---|---|---|---|---|---|---|---|---|---|
| D | S | U | UL-B | U | D | D | DL-B | DL-B | DL-B |

(a)

| 0 | 1 | 2 | 3 | 4 | 5 | 6 | 7 | 8 | 9 |
|---|---|---|---|---|---|---|---|---|---|
| D | S | U | DL-B | DL-B | D | S | UL-B | D | DL-B |

| 0 | 1 | 2 | 3 | 4 | 5 | 6 | 7 | 8 | 9 |
|---|---|---|---|---|---|---|---|---|---|
| D | S | U | U | DL-B | D | S | U | UL-B | DL-B |

Fig.7

| 0 | 1 | 2 | 3 | 4 | 5 | 6 | 7 | 8 | 9 |
|---|---|---|---|---|---|---|---|---|---|
| D | DL-B | U | UL-B | U | D | DL-B | U | UL-B | U |

(a)

| 0 | 1 | 2 | 3 | 4 | 5 | 6 | 7 | 8 | 9 |
|---|---|---|---|---|---|---|---|---|---|
| D | UL-B | U | DL-B | DL-B | D | D | DL-B | D | D |

TRANSFERRING METHOD, RELAY STATION AND BASE STATION FOR UPLINK FEEDBACK INFORMATION IN RELAY LINK

CROSS-REFERENCE TO RELATED APPLICATIONS

This application is a National Phase Application of PCT International Patent Application No. PCT/CN2010/073688, International Filing Date Jun. 8, 2010, claiming priority of Chinese Patent Application No. 200910149077.4 filed Jun. 16, 2009, both of which are incorporated herein by reference.

FIELD OF THE INVENTION

The present invention relates to communication, and in particular to a method for transmitting relay link uplink feedback information, a relay station and a base station.

BACKGROUND OF THE INVENTION

Currently, the development requirements of mobile communication are being able to support higher data rate, better coverage and higher resource efficiency. In order to achieve higher data rate, next generation mobile communication system will employ transmissions with wider frequency bandwidth, while wider frequency bandwidth will bring greater path loss, which affects the network coverage. The relay technology is capable of enhancing coverage as well as balancing and increasing cell throughput; and a relay station has relatively small deployment costs in contrast to a base station, and therefore the relay is viewed as a key technology in the evolved system of Long Term Evolution (LTE), i.e., LTE-Advanced (LTE-A) system.

In a time division dual (TDD) LTE system, frequency resources are divided in unit of frame over time. FIG. 1a is a schematic diagram of frame structure in a TDD system according to the related art. As shown in FIG. 1a, the length of each radio frame is 10 milliseconds and contains 10 subframes, with the length of each of the subframes being 1 millisecond, wherein the subframes comprise uplink subframe(s), downlink subframe(s) and special subframe(s) which is also referred to as frame structure type 2 in LTE specifications. Depending on the different ratios of the uplink/downlink subframe(s), there are 7 configurations in the TDD LTE system, and the system can flexibly perform subframe configuration according to information such as uplink/downlink traffic in a cell. The 7 configurations are shown in Table 1 specifically, wherein D represents downlink subframe(s), U represents uplink subframe(s), and S represents special subframe(s). FIG. 1b is a schematic diagram of the structure of a special subframe in the TDD system according to the related art. As shown in FIG. 1b, an S subframe includes a part of downlink pilot time slot (DwPTS), uplink pilot time slot (UpPTS) and a guard period (GP) for switching between the uplink and the downlink. As an evolved system of TDD LTE, the TDD LTE-A system should ensure backward compatibility and hence will maintain the same frame structure as that of TDD LIE.

TABLE 1

A table of subframe uplink/downlink configuration forms in the TDD LTE system

| subframe uplink/downlink configuration | subframe number | | | | | | | | | |
|---|---|---|---|---|---|---|---|---|---|---|
| | 0 | 1 | 2 | 3 | 4 | 5 | 6 | 7 | 8 | 9 |
| 0 | D | S | U | U | U | D | S | U | U | U |
| 1 | D | S | U | U | D | D | S | U | U | D |
| 2 | D | S | U | D | D | D | S | U | D | D |
| 3 | D | S | U | U | U | D | D | D | D | D |
| 4 | D | S | U | U | D | D | D | D | D | D |
| 5 | D | S | U | D | D | D | D | D | D | D |
| 6 | D | S | U | U | U | D | S | U | U | D |

In a TDD LTE Release 8 system, service data transmission and corresponding feedback information transmission meets a certain timing relationship. Take the uplink feedback of downlink service transmission as an example. At downlink subframe having subframe number n-k, a base station (or known as evolved Node B, i.e. eNB in LTE/LTE-A) transmits data, and at uplink subframe having subframe number n a user equipment transmits the corresponding acknowledge/negative acknowledge (ACK/NACK) feedback information to the base station according to the data reception. In this case, k is defined according to the subframe uplink/downlink configuration and subframe locations of the TDD system, which is shown in Table 2 specifically.

TABLE 2

A table of uplink feedback timing k value in the TDD LTE system

| subframe uplink/downlink configuration | subframe number n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

When the relay station is introduced into the TDD LTE-A system, there is one more hop added to data transmission, i.e., the original communication mode of base station-terminal changes. Take a two-hop system as an example, the communication mode of a terminal which receives the services of a relay station changes to be a mode of base station-relay station-terminal. In this case, it needs to allocate part of the uplink and downlink resources for base station-relay station communication, i.e., a part of subframes are allocated for use by the communication between the base station and the relay station. These subframes are referred to as relay subframes and corresponding links are referred to as relay links or backhaul links (or Un interface and corresponding relay subframes can also be referred to as Un subframes or backhaul subframes). However, considering the interference problem, the relay station cannot perform transmitting and receiving simultaneously in same frequency resource, and in this case, if the ACK/NACK timing defined in the TDD LTE Release 8 specification is reused, some ACK/NACK feedback information of relay link may be lost.

Take subframe uplink/downlink configuration 3 of the TDD system as an example. If subframe 7, 8, and 9 are configured as downlink relay subframes and subframe 3 is configured as an uplink relay subframe, ACK/NACK feedbacks corresponding to data transmission in these 3 subframes are transmitted in uplink subframe 3, 3, and 4 respectively according to TDD LTE Release 8 specification. In this case, if the ACK/NACK timing defined in TDD LTE Release 8 specification is reused for relay link, ACK/NACK feedback information corresponding to data transmission in subframe 9 will be lost.

SUMMARY OF THE INVENTION

The present invention is proposed regarding the problem that the uplink feedback information ACK/NACK is lost caused by that the feedback timing relationship of ACK/NACK information specified in the TDD LTE Release 8 specification is continued to be used without considering the configuration condition of the relay subframe. The present invention provides an improved solution for transmitting relay link uplink feedback information so as to solve the above problem.

A method for transmitting relay link uplink acknowledge/negative acknowledge feedback information is provided according to one aspect of the present invention.

The method for transmitting relay link uplink acknowledge/negative acknowledge feedback information according to the present invention comprises: determining timing relationship for transmitting the uplink feedback information according to relay subframe configuration; and a relay station determining an uplink relay subframe for transmitting the uplink feedback information according to the timing relationship, and transmitting the uplink feedback information via the uplink relay subframe.

Preferably, the step of determining the timing relationship for transmitting uplink feedback information of service data according to the relay subframe configuration comprises: the relay station acquiring the relay subframe configuration and determining, according to the acquired relay subframe configuration, the timing relationship from pre-determined correspondence, wherein the correspondence is between the relay subframe configuration and uplink feedback information transmission timing relationship, or the correspondence is between subframe locations of relay link downlink service transmission and corresponding uplink feedback information transmission; or a base station determining the timing relationship according to the relay subframe configuration and sending indication information to the relay station, wherein the indication information is used for indicating the timing relationship.

Preferably, the indication information at least comprises one of the following: subframe number of the uplink relay subframe and offset of the uplink relay subframe.

Preferably, the step of the base station sending the indication information to the relay station comprises: the base station sending service data to the relay station via a downlink relay subframe and carrying the indication information in downlink control information corresponding to the service data.

Preferably, the step of the relay station transmitting the uplink feedback information via the uplink relay subframe comprises: in a situation that the relay station transmits multiple uplink feedback information via an uplink relay subframe, the relay station transmitting the multiple uplink feedback information in a bundling feedback mode or in a multiplexing feedback mode.

Preferably, the step of the relay station transmitting the uplink feedback information via the uplink relay subframe comprises: if resources in a special subframe are used for transmitting downlink service to the relay station by a base station, the relay station transmitting uplink feedback information of the downlink service via the uplink relay subframe subsequent to the special subframe.

Preferably, the step of the relay station transmitting the uplink feedback information via the uplink relay subframe comprises: if only resources in the special subframe are used by the relay station to transmit relay link uplink data to a base station, the relay station transmitting the uplink feedback information via the special subframe.

A relay station is provided according to another aspect of the present invention.

The relay station according to the present invention comprises: a first determining module, configured to determine timing relationship for transmitting uplink feedback information according to relay subframe configuration; a second determining module, configured to determine an uplink relay subframe for transmitting the uplink feedback information according to the timing relationship; and a transmitting module, configured to transmit the uplink feedback information via the uplink relay subframe.

Preferably, the first determining module comprises: an acquiring sub-module, configured to acquire the relay subframe configuration; a first determining sub-module, configured to determine the timing relationship from pre-determined correspondence according to the acquired relay subframe configuration, wherein the correspondence is between the relay subframe configuration and the uplink feedback information transmission timing relationship, or the correspondence is between subframe locations of relay link downlink service transmission and uplink feedback information transmission.

Preferably, the first determining module comprises: a receiving sub-module, configured to receive indication information of the timing relationship from a base station, wherein the indication information is used for determining the timing relationship.

A base station is provided according to another aspect of the present invention.

The base station according to the present invention comprises: a determining module, configured to determine timing relationship according to relay subframe configuration; a sending module, configured to send indication information to a relay station, wherein the indication information is used for indicating the timing relationship; and a receiving module, configured to receive uplink feedback information according to an uplink relay subframe determined by the timing relationship.

Preferably, the sending module is also configured to send service data to the relay station via a downlink relay subframe and to carry the indication information in downlink control information corresponding to the service data.

The present invention solves the problem of the loss of the uplink feedback information ACK/NACK in a system including a relay station by determining the timing relationship for transmitting uplink feedback information according to the relay subframe configuration, which ensures the reliability of the downlink communication of the base station and the relay station, and the transmission of this feedback information would not affect the user equipment.

BRIEF DESCRIPTION OF THE DRAWINGS

Drawings, provided for further understanding of the present invention and forming a part of the specification, are used to explain the present invention together with embodiments of the present invention rather than to limit the present invention, wherein

FIG. 4 is a schematic diagram of the relay subframe configuration in embodiment 1 of the present invention;

FIG. 5 is a schematic diagram of the relay subframe configuration in embodiment 2 of the present invention;

FIG. 6 is a schematic diagram of the relay subframe configuration in embodiment 3 of the present invention;

FIG. 7 is a schematic diagram of the relay subframe configuration in embodiment 4 of the present invention;

FIG. 8 is a schematic diagram of the relay subframe configuration in embodiment 5 of the present invention;

DETAILED DESCRIPTION OF EMBODIMENTS

Currently, the problem, that relay link uplink ACK/NACK feedback information is lost, which would be caused if the ACK/NACK feedback timing relationship specified in TDD LTE Release 8 specification is reused in relay links, is not considered in LTE/LTE-A Relay relevant art. The embodiments of the present invention provide a solution for transmitting relay link uplink feedback information; and the processing principle of the solution is that: when the configuration of uplink/downlink relay subframes makes the transmission of the uplink ACK/NACK feedback information of the relay links cannot be carried out according to the timing relationship specified in the TDD LTE Release 8 specification, the system defines a new feedback timing relationship for the uplink ACK/NACK information of relay link downlink service transmission; and a relay station transmits the uplink ACK/NACK information according to the new feedback timing relationship. That is to say, after the relay subframes is configured, under the relay subframe configuration, if the timing relationship of uplink ACK/NACK feedback transmission specified in the TDD LTE Release 8 specification can be used as the timing relationship of the relay link downlink service transmission and the uplink feedback information transmission, the relay link uplink ACK/NACK feedback information is transmitted according to the timing relationship defined by the TDD LTE Release 8; otherwise, a new uplink ACK/NACK feedback timing relationship is defined for the relay links. To be more specific: determine the timing relationship for transmitting the uplink feedback information according to the relay subframe configuration; and the relay station determines uplink relay subframe(s) for transmitting the uplink feedback information according to the timing relationship, and transmits the uplink feedback information via the uplink relay subframe(s).

It needs to be noted that the embodiments of the present application and the features in the embodiments can be combined with each other if there is no conflict. The present invention will be described in detail hereinafter with reference to the drawings and in conjunction with the embodiments.

Method Embodiments

In the following embodiments, the steps shown in the flowcharts of the accompany drawings can be executed in a computer system such as a set of computer executable instructions; and although a logical order is shown in the flowcharts, the steps shown or described here can be executed in an order different from this in some circumstances.

Figure 2:
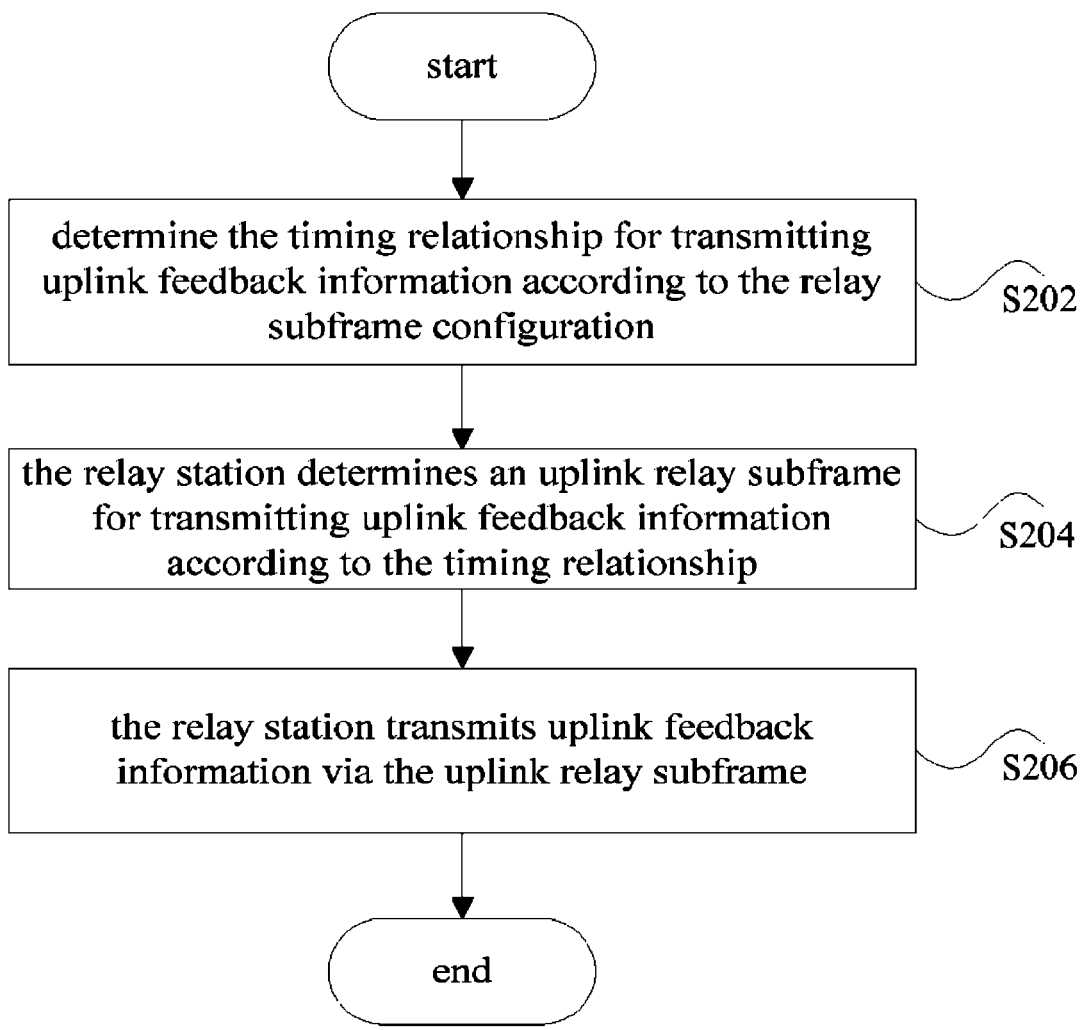
FIG. 2 is a flowchart of a method for transmitting relay link uplink feedback information according to the embodiments of the present invention.

A method for transmitting relay link uplink feedback information is provided according to the embodiments of the present invention. FIG. 2 is a flowchart of the method for transmitting relay link uplink feedback information according to the embodiments of the present invention, and as shown in FIG. 2, the method comprises the following steps S202 to S206.

Step S202: Timing relationship for transmitting the uplink feedback information is determined according to relay subframe configuration.

Step S204: A relay station determines uplink relay subframe(s) for transmitting the uplink feedback information according to the timing relationship.

Step S206: The relay station transmits the uplink feedback information via the uplink relay subframe(s).

In the related art, the transmission of the uplink feedback information does not consider the configuration of the relay subframes. In the embodiments of the present invention, the timing relationship can be used for reflecting the configuration of the relay subframes; and the relay station determines the uplink relay subframe(s) for transmitting the uplink feedback information according to the timing relationship, which can avoid the loss of the uplink feedback information ACK/NACK.

Preferably, in the Step S206, when the relay station is transmitting feedback information in the uplink, if multiple feedback information of downlink services needs to be fed back in an uplink relay subframe, the relay station sends the multiple uplink feedback information to a base station in a bundling feedback mode or in a multiplexing feedback mode after having generated the feedback information according to a feedback mode predetermination or indicated by a higher layer signaling.

It needs to be noted that, in the Step S202, there are two situations in which the timing relationship for transmitting the uplink feedback information of service data is determined according to the relay subframe configuration. And these two situations will be described in detail hereinafter.

Situation 1: The relay station acquires the relay subframe configuration and determines the timing relationship from pre-determined correspondence according to the acquired relay subframe configuration, wherein the correspondence is between the relay subframe configuration and the uplink feedback information transmission timing relationship, or the correspondence is between subframe locations of relay link downlink service transmission and corresponding uplink feedback information transmission. Specifically, the situation 1 comprises the following process.

First, the base station and the relay station make an agreement on the timing relationship between the uplink feedback information and the downlink service transmission over the relay links according to possible relay subframe configuration in each subframe uplink/downlink configuration, that is to say, as to each relay subframe configuration situation, the timing relationship of relay link downlink service transmission and corresponding uplink feedback information transmission is pre-determined. The pre-determination here means that the timing relationship between the uplink feedback information and the downlink service transmission is fixed via a standard specification, and the timing relationship does not need to be transmitted by a signaling.

Then, the relay station determines a corresponding feedback timing relationship according to the relay subframe configuration information from the base station and a pre-determined relationship, and transmits the feedback information in corresponding uplink relay subframe(s) according to the feedback timing relationship.

Situation 2: The base station determines the timing relationship according to the relay subframe configuration and sends indication information to the relay station, wherein the indication information is used for indicating the timing relationship. That is to say, the base station sets the timing relationship between the uplink feedback information transmission and the downlink service transmission over the relay links according to the configuration of the relay subframes, and indicates the timing relationship to the relay station; and the relay station determines the corresponding feedback timing relationship according to the indication and transmits the uplink feedback information according to the feedback timing relationship.

The base station can send the service data to the relay station via downlink relay subframe(s) and the indication information is carried in downlink control information corresponding to the service data. That is to say, the base station sends the indication information via a relay link downlink control signaling corresponding to the service data sent to the relay station.

In this case, the indication information can be the subframe number of an uplink relay subframe for transmitting the uplink feedback information, or can be the offset of the uplink relay subframe. The offset means: the offset of a feedback information transmission subframe relative to a relay link downlink service data transmission subframe, wherein the offset is the offset relative to all the subframes, or the offset of a feedback information transmission subframe relative to the first uplink relay subframe subsequent to the relay link downlink service data transmission subframe, wherein the offset is the offset relative to the uplink relay subframe.

Preferably, before determining the timing relationship for transmitting the uplink feedback information according to the relay subframe configuration, it is judged under the relay subframe configuration whether the timing relationship of the uplink feedback information specified in the TDD LTE Release 8 specification can be used; if it is determined to be yes, the uplink feedback information is transmitted according to the timing relationship of the uplink feedback information transmission defined in the TDD LTE Release 8 specification; and otherwise, the timing relationship for transmitting the uplink feedback information is determined according to the relay subframe configuration.

When the relay station transmits the feedback information according to the timing relationship described in the present invention, if multiple feedback information of downlink services needs to be fed back in an uplink relay subframe, the relay station sends the multiple uplink feedback information to the base station in the bundling feedback mode or in the multiplexing feedback mode after having generated the feedback information according to the feedback mode pre-determined or indicated by a higher layer signaling.

It needs to be noted that, if the base station uses resources in the special subframe to transmit downlink services to the relay station, the step that the relay station transmits the feedback information of the downlink service can comprises the following two situations: (1) if resources in the special subframe are used by the base station to transmit the downlink services to the relay station, the relay station transmits the uplink feedback information of the downlink services via a uplink relay subframe subsequent to the special subframe. That is to say, when resources in special subframe S are used for the service transmission from the base station to the relay station, the uplink feedback information of the relay link downlink service transmission in the special subframe S is transmitted in a certain uplink relay subframe subsequent to the subframe S; and (2) if only the resources in the special subframe are used to transmit uplink services from the relay station to the base station, the relay station will transmit the uplink feedback information of the downlink services via the special subframe. That is to say, when only the resources in special subframe S are used for the service transmission from the relay station to the base station, the uplink feedback information of the relay link downlink service transmission is transmitted in special subframe S.

The present embodiment will be described hereinafter according to the subframe uplink/downlink configuration form in a TDD LTE system in Table 1.

As to Subframe Uplink/Downlink Configuration 1

When subframe 4 is configured to be a downlink relay subframe, if only subframe 3 is configured to be an uplink relay subframe, the corresponding feedback information of the relay link downlink service data transmission in subframe 4 of number n radio frame will be preferably transmitted in uplink relay subframe 3 of number n+1 radio frame; and if subframe 8 is configured to be an uplink relay subframe, the corresponding feedback information of the relay link downlink service data transmission in subframe 4 of number n radio frame will be preferably transmitted in uplink relay subframe 8 of number n radio frame, i.e., the transmission of the relay link uplink feedback information can reuse the uplink feedback information transmission timing specified in the TDD LTE Release 8 specification.

When subframe 9 is configured to be a downlink relay subframe, if only subframe 8 is configured to be an uplink relay subframe, the corresponding feedback information of the relay link downlink service data transmission in subframe 9 of number n radio frame will be preferably transmitted in uplink relay subframe 8 of number n+1 radio frame; and if subframe 3 is configured to be an uplink relay subframe, the corresponding feedback information of the relay link downlink service data transmission in subframe 9 of number n radio frame will be preferably transmitted in uplink relay subframe 3 of number n+1 radio frame, i.e., the transmission of the relay link uplink feedback information can reuse the uplink feedback information transmission timing specified in the TDD LTE Release 8 specification.

As to Subframe Uplink/Downlink Configuration 2

When only subframe 2 is configured to be an uplink relay subframe, if subframe 3 and/or 9 is/are configured to be downlink relay subframe(s), the corresponding feedback information of the relay link downlink service data transmission in subframe 3 of number n radio frame will be preferably transmitted in uplink relay subframe 2 of number n+1 radio frame, and the corresponding feedback information of the relay link downlink service data transmission in subframe 9 of number n radio frame will be preferably transmitted in uplink relay subframe 2 of number n+2 radio frame; and if subframe 4 and/or 8 is/are configured to be downlink relay subframe(s), the corresponding feedback information of the relay link downlink service data transmission in subframe 4 and/or 8 of number n radio frame will be preferably transmitted in uplink relay subframe 2 of number n+1 radio frame, i.e., the transmission of the relay link uplink feedback information can reuse the uplink feedback information transmission timing specified in the TDD LTE Release 8 specification.

When only subframe 7 is configured to be an uplink relay subframe, if subframe 4 and/or 8 is/are configured to be downlink relay subframe(s), the corresponding feedback information of the relay link downlink service data transmission in uplink relay subframe 4 and/or 8 of number n radio frame will be preferably transmitted in uplink relay subframe 7 of number n+1 radio frame; and if subframe 3 and/or 9 is/are configured to be downlink relay subframe(s), the corresponding feedback information of the relay link downlink service data transmission in subframe 3 of number n radio frame will be preferably transmitted in uplink relay subframe 7 of number n radio frame, and the corresponding feedback information of the relay link downlink service data transmission in subframe 9 of number n radio frame will be preferably transmitted in uplink relay subframe 7 of number n+1 radio frame, i.e., the transmission of the relay link uplink feedback information can reuse the uplink feedback information transmission timing specified in the TDD LTE Release 8 specification.

As to Subframe Uplink/Downlink Configuration 3

When only subframe 3 is configured to be an uplink relay subframe, if subframe 9 is configured to be a downlink relay subframe, the corresponding feedback information of the relay link downlink service data transmission in subframe 9 of number n radio frame will be preferably transmitted in uplink relay subframe 3 of number n+1 radio frame. Preferably, it is not limited that only subframe 3 is configured to be an uplink relay subframe, i.e., if subframe 9 is configured to be a downlink relay subframe, when subframe 3 is configured to be an uplink relay subframe, the corresponding feedback information of the relay link downlink service data transmission in subframe 9 of number n radio frame will be preferably transmitted in uplink relay subframe 3 of number n+1 radio frame.

When subframe 3 is configured to be an uplink relay subframe, if subframe 7 and/or 8 is/are configured to be downlink relay subframe(s), the corresponding feedback information of the relay link downlink service data transmission in subframe 7 and/or 8 of number n radio frame will be preferably transmitted in uplink relay subframe 3 of number n+1 radio frame, i.e., the transmission timing of the relay link uplink feedback information can reuse the uplink feedback information transmission timing specified in the TDD LTE Release 8 specification; or, when subframe 7 and/or 8 is/are configured to be downlink relay subframe(s), if only subframe 2 is configured to be an uplink relay subframe, the corresponding feedback information of the relay link downlink service data transmission in subframe 7 and/or 8 of number n radio frame will be preferably transmitted in uplink relay subframe 2 of number n+1 radio frame.

As to Subframe Uplink/Downlink Configuration 4

When subframe 3 is configured to be an uplink relay subframe, if subframe 4 is configured to be a downlink relay subframe, the corresponding feedback information of the relay link downlink service data transmission in subframe 4 of number n radio frame will be preferably transmitted in uplink relay subframe 3 of number n+1 radio frame; and if subframe 7 and/or 8 and/or 9 is/are configured to be downlink relay subframe(s), the corresponding feedback information of the relay link downlink service data transmission in subframe 7 and/or 8 and/or 9 of number n radio frame will be preferably transmitted in uplink relay subframe 3 of number n+1 radio frame, i.e., the transmission timing of the relay link uplink feedback information can reuse the uplink feedback information transmission timing specified in the TDD LTE Release 8 specification.

When only subframe 2 is configured to be an uplink relay subframe, if subframe 7 and/or 8 is/are configured to be downlink relay subframe(s), the corresponding feedback information of the relay link downlink service data transmission in subframe 7 and/or 8 of number n radio frame will be preferably transmitted in uplink relay subframe 2 of number n+1 radio frame.

As to Subframe Uplink/Downlink Configuration 6

When only subframe 3 is configured to be an uplink relay subframe, if subframe 9 is configured to be a downlink relay subframe, the corresponding feedback information of the relay link downlink service data transmission in subframe 9 of number n radio frame will be preferably transmitted in uplink relay subframe 3 of number n+1 radio frame.

When subframe 4 is configured to be an uplink relay subframe, if subframe 9 is configured to be a downlink relay subframe, the corresponding feedback information of the relay link downlink service data transmission in subframe 9 of number n radio frame will be preferably transmitted in uplink relay subframe 4 of number n+1 radio frame, i.e., the transmission timing of the relay link uplink feedback information can reuse the uplink feedback information transmission timing specified in the TDD LTE Release 8 specification.

The above steps S202 to S206 are described in detail hereinafter.

Figure 3:
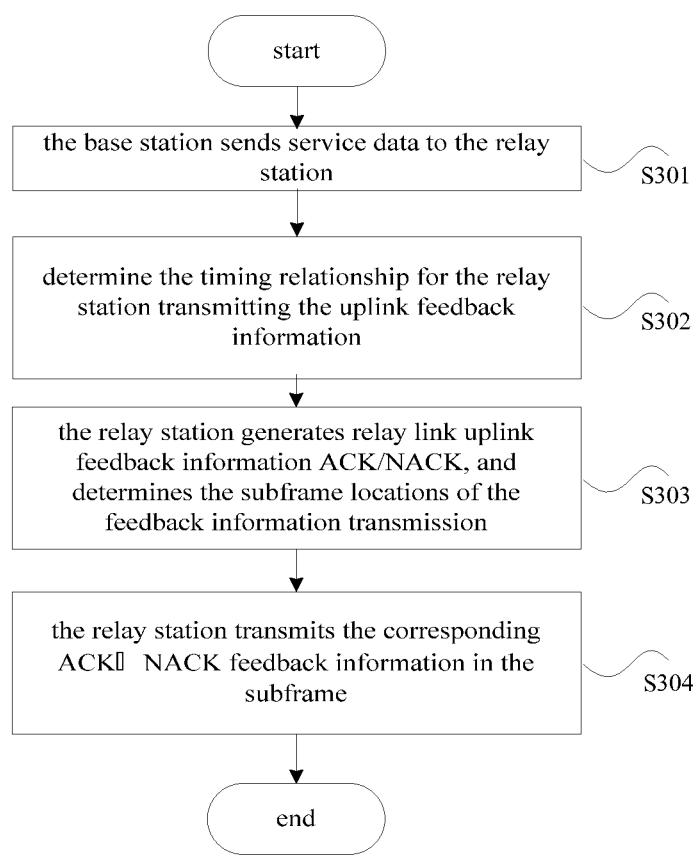
FIG. 3 is a detailed flowchart of the method for transmitting relay link uplink feedback information according to the embodiments of the present invention.

FIG. 3 is a detailed flowchart of the method for transmitting relay link uplink feedback information according to the embodiments of the present invention, and as shown in FIG. 3, the flow comprises the following steps S301 to S304.

Step S301: The base station sends the service data to the relay station.

Step S302: The timing relationship for transmitting uplink feedback information of the relay station is determined.

In this step, when the relay station and the base station have made an agreement on the subframe locations of the relay link uplink feedback transmission, i.e., for the possible relay subframe configuration, the transmission timing relationship of the corresponding relay link uplink feedback information is pre-determined. After obtaining the relay subframe configuration information, the relay station uses the relay subframe configuration information to determine the timing relationship of corresponding uplink feedback information transmission.

Alternatively, the base station indicates the timing relationship of the relay link uplink feedback information transmission to the relay station via the downlink signaling. This indication signaling (i.e., indication information) can directly indicate the subframe number of the feedback information transmission; or the offset of the subframe location of the feedback information transmission relative to the subframe location of the downlink service transmission, wherein the offset is the offset relative to all the subframes; or the offset of the subframe location of the feedback information transmission relative to the first uplink relay subframe subsequent to the relay link downlink service transmission subframe, wherein the offset is the offset relative to an uplink relay subframe subsequent to the downlink service transmission. The offset is used for the relay station to determine the subframe location of the ACK/NACK feedback. It needs to be noted that the above indication signaling can be comprised in the corresponding control information of the service data sent by the base station to the relay station.

Step S303: The relay station generates the relay link uplink feedback information ACK/NACK and determines subframe(s) of the feedback information transmission.

In the step S303, after receiving the relay link downlink service data, the relay station generates corresponding feedback information ACK or NACK according to the result of checking the data.

Step S304: After determining uplink relay subframe(s) for transmitting ACK/NACK information, the relay station transmits corresponding ACK/NACK feedback information in the subframe(s).

In the step S304, when the relay station needs to transmit multiple ACK/NACK feedback information of the downlink service in one subframe, the relay station can use the bundling feedback mode or the multiplexing feedback mode, and the feedback mode can be pre-determined between the base station and the relay station and can also determined by the indication of the higher layer signaling.

The implementation process of the embodiments of the present invention will be described in detail hereinafter in conjunction with examples.

Due to the interference problem between receiving and sending, it is caused that the relay stations can not send and receive simultaneously on same resources; therefore, a part of the uplink and downlink subframes are respectively allocate to be used for the communication between the relay stations and the base station. In this case, if the feedback timing relationship of the uplink ACK/NACK information specified in the TDD LTE Release 8 specification is reused, it may be caused that some uplink ACK/NACK feedback information of the relay link is lost. Therefore, when the relay subframe configuration makes the relay link uplink ACK/NACK feedback information transmission cannot reuse the uplink feedback information transmission time sequence specified in the TDD LTE Release 8 specification, the timing relationship of the relay link uplink ACK/NACK information feedback transmission needs to be re-determined, thereby ensuring the reliability of the relay link downlink service transmission.

Example 1

In example 1, a part of the uplink and downlink subframes are configured to be used for the communication between the base station and the relay station. In this example, subframe uplink/downlink configuration 3 is taken as an example (as shown in Table 1). In this example, subframe 3 of each radio frame is configured to be an uplink relay subframe, and subframes 7, 8 and 9 can be configured to be downlink relay subframes (having subframe numbers 0-9). As shown in FIG. 4, DL-B represents the downlink relay subframe, i.e., in the DL-B subframe, the relay station receives the services from the base station; and UL-B represents the uplink relay subframe, i.e., in the UL-B subframe, the relay station sends data to the base station.

According to the provisions of the existing TDD LTE specification, in subframe uplink/downlink configuration 3, the corresponding ACK/NACK feedback information of the service data transmission in downlink subframes 7, 8 and 9 is respectively transmitted in uplink subframes 3, 3 and 4. In this example, subframe 4 is not an uplink relay subframe, i.e., in subframe 4, the relay station receives data information from subordinate user equipment (UE) (s); therefore, if according to the provisions in the existing TDD LTE specification, the relay station cannot feed back the ACK/NACK information after receiving the service data of the base station in subframe 9.

In this example, for the downlink service data sent from the base station to the relay station in subframe 9 of number n radio frame, the relay station performs feedback in uplink relay subframe 3 of number n+1 radio frame. That is to say, in subframe 3 of n+1 radio frame, the relay station feeds back the corresponding ACK/NACK information of the service data transmission in subframes 7, 8 and 9 of number n radio frame to the base station.

In this example, the timing relationship of the corresponding ACK/NACK feedback information of the downlink relay link service data is already defined, that is, it is pre-determined that if there is downlink relay service in subframes 7, 8 and 9, the corresponding feedback information will be fed back in subframe 3 of a next radio frame. Under this pre-determination, the base station indicates the transmission location of the feedback information to the relay station without additional signaling.

The feedback transmission process of the relay station is as follows: after the relay station receives the service data of the base station in one or more of downlink relay subframes 7, 8 and 9 of number n radio frame, an uplink feedback information generating means generates the corresponding ACK or NACK information according to the check results of the data, uses the pre-determined feedback information transmission timing relationship between the base station and the relay station to determine that the feedback information transmission subframe is uplink relay subframe 3 of number n+1 radio frame, and indicates the same to a transmitting module. In subframe 3 of number n+1 radio frame, the transmitting module sends the corresponding ACK/NACK information according to the indication.

When the relay station needs to feed back multiple ACK/NACK information in one uplink relay subframe, the relay station can use the bundling feedback mode, i.e., feeding back the AND operation results of the multiple ACK/NACK information, or use the multiplexing feedback mode, i.e., feeding back the multiple ACK/NACK information. The feedback mode is pre-determined between the relay station and the base station, for example, if it is pre-determined that the multiplexing feedback mode is used when feeding back multiple ACK/NACK information; or is indicated to the relay station via the higher layer signaling.

Example 2

In example 2, a part of the uplink and downlink subframes are configured to be used for the communication between the base station and the relay station. In this example, subframe uplink/downlink configuration 4 is taken as an example (as shown in Table 1).

In this example, the base station configures the relay subframes according to information such as possible traffic of the relay station. It is assumed that for subframe uplink/downlink configuration 4, there can be 3 candidate relay subframe configuration solutions according to the number of the downlink relay subframes, and the solutions are referred to as relay subframe configuration solution 1, 2 and 3 and are as shown in FIGS. 5(a), 5(b) and 5(c) respectively. In this case, the meanings of DL-B and UL-B are the same as that described in the above. When there are communication requirements between the base station and the relay station in subframe uplink/downlink configuration 4, the base station selects, according to information such as the possible traffic of the relay station, one of these 3 defined relay subframe configuration solutions as the current relay subframe configuration and indicates the same to the relay station.

In this example, these 3 relay subframe configuration solutions correspond respectively to the corresponding feedback timing relationship of relay link uplink ACK/NACK information. As to each relay subframe configuration solution, the timing relationship of the downlink service and the uplink feedback information transmission of the relay link are already defined. As to relay subframe configuration solution 1, the transmission location of the corresponding ACK/NACK feedback information of the service data transmission in downlink relay subframes 8 and 9 can be just according to the ACK/NACK feedback timing relationship specified in the TDD LTE Release 8 specification, i.e., the corresponding ACK/NACK information is fed back in uplink relay subframe 3. As to relay subframe configuration solution 2, the uplink ACK/NACK feedback of the relay link also uses the ACK/NACK feedback timing relationship specified in the TDD LTE specification. As to relay subframe configuration solution 3, the corresponding feedback information of the service transmission in downlink subframe 4 will be fed back in uplink subframe 2 of a next radio frame according to the ACK/NACK feedback timing in the TDD LTE. However, in this example, subframe 2 is an ordinary uplink subframe; therefore if the feedback timing in the existing TDD LTE Release 8 specification is based on and the base station sends service data to the relay station in downlink subframe 4, the relay station can not feed back the corresponding ACK/NACK information. Therefore, for the downlink service data in relay subframe 4, the relay station will feed back the corresponding ACK/NACK information in uplink relay subframe 3. When the base station configures the relay subframes by using relay subframe configuration solution 3, the process is as follows.

1) The base station indicates, via a downlink signaling, for the relay station, that the relay subframe configuration uses configuration solution 3.

In this example, the base station indicates the configuration solution of the relay subframes for the relay station via the downlink signaling. The indicating method does not belong to the contents related in the present invention, and will not be described here.

2) The relay station generates feedback information ACK/NACK, determines the subframe location of the uplink feedback information transmission of the downlink relay service transmission according to the relay subframe configuration of the base station, and sends the corresponding ACK/NACK information in the determined uplink feedback subframe(s).

After receiving the downlink service data of the base station, the relay station generates the corresponding ACK/NACK information. After receiving the downlink signaling of the base station, the relay station determines, according to the indication of the base station, that the current relay subframe configuration is solution 3 (as shown in FIG. 5(c)). Since for each relay subframe configuration solution, the timing relationship of the downlink relay service and the uplink feedback information transmission is determined, the relay station determines to feed back, in uplink relay subframe 3, the corresponding ACK/NACK information of the service data transmission in downlink relay subframes 4, 7, 8 and 9 of the previous radio frame.

When the relay station needs to feed back multiple ACK/NACK information in one uplink relay subframe, the relay station can use the bundling feedback mode, i.e., feeding back the AND operation results of the multiple ACK/NACK information, or uses the multiplexing feedback mode, i.e., feeding back multiple ACK/NACK information. The feedback mode is pre-determined between the relay station and the base station, for example, it is pre-determined that the multiplexing feedback mode is used when feeding back multiple ACK/NACK information; or the relay station is indicated via a higher layer signaling.

In this example, once the relay subframe configuration solution is determined, the timing relationship of the relay link uplink feedback information ACK/NACK transmission is determined.

Example 3

In this example 3, a part of the uplink and downlink subframes are configured to be used for the communication between the base station and the relay station, and this configuration is dynamic. The so-called dynamic means that for a certain form of subframe uplink/downlink configuration, the relay subframe is configured in real time, and the base station informs the relay station of the configuration information of the relay subframe via a downlink signaling of the relay links.

Since the relay station needs to send information such as broadcast, paging, and synchronization in subframes 0, 1, 5, and 6 to the subordinate UE(s), the remaining subframes can be configured to be relay subframes. When the relay subframes are configured dynamically, the transmission timing relationship of the corresponding ACK/NACK feedback information of the relay link downlink service transmission can be indicated by the base station sending control information to the relay station. For example, when the base station sends service data to the relay station, the base station adds information bit(s) in the corresponding control information of the service data to indicate the subframe location of the uplink feedback information ACK/NACK transmission. The information bit(s) can be the number of the feedback subframe, i.e., the subframe number transmitting the feedback information is which directly indicated. Take subframe uplink/downlink configuration 3 as an example, it is assumed that subframe 3 and subframes 7, 8 and 9 of number n radio frame and number n+1 radio frame are respectively configured as an uplink relay subframe and downlink relay subframes, as shown in FIG. 6(a). When the base station sends service data to the relay station in subframe 9, the base station indicates the feedback subframe to be subframe 3 in the feedback location indication bit(s), for example, when the feedback location indication bits are 4 bits, the feedback location indication bits can be set to be 0011 at this moment, which represents that the feedback location is number 3 subframe. After having received the service data and the control information, the relay station feed back the ACK/NACK information in subframe 3 of the next radio frame. Alternatively, this indication information can represent the offset of the feedback location; and the relay station determines the subframe location of the feedback information transmission according to the offset. The offset can be determined by one of the following methods.

1) The offset is the offset relative to this downlink subframe. For example, still take FIG. 6(a) as an example. Subframe 9 in the current radio frame is a downlink relay subframe. In the subframe 9, the service data is sent to the relay station, and at the same time the offset indicated in the corresponding control information is 4, the relay station sends the corresponding feedback information ACK/NACK in uplink subframe 3 of the next radio frame.

2) The offset is the offset relative to the next uplink relay subframe in the relay subframes. For example, 1 bit is used to represent the offset, wherein 0 represents that there is no offset, i.e., the feedback is performed in the next uplink relay subframe after the downlink relay service transmission; and 1 represents that the offset is an uplink relay subframe, i.e., the feedback is performed in the second uplink relay subframe after the relay subframe of this downlink service transmission. Take subframe uplink/downlink configuration 2 as an example, for example, subframes 3, 4 and 9 of number n and n+1 radio frames are configured to be downlink relay subframes, and subframe 7 is an uplink relay subframe, as shown in FIG. 6(b). Since the space between subframe 4 and subframe 7 is relatively small, the relay station may not finish the process such as decoding and checking for the received data packets in downlink subframe 4 when sending in uplink relay subframe 7; therefore the base station sets the feedback offset to be 1 when sending service data to the relay station in number 4 subframe of number n radio frame, and the relay station transmits, after having received this offset indication information, the corresponding feedback information in the second uplink relay subframe subsequent to this downlink service transmission subframe, i.e., the feedback information ACK/NACK is sent to the relay station in subframe 7 of number n+1 radio frame.

In the above several methods of indicating the offset, it should be determined according to the uplink/downlink relay subframe configuration when determining the offset.

The feedback transmission process of the relay station is that: after the relay station has received the service data of the base station in one or more of the downlink relay subframes, an uplink feedback information generating module generates the corresponding ACK or NACK information according to the check results of the data, uses the received feedback transmission location or feedback transmission offset indication to determine feedback information transmission subframe(s), and indicates the same to a transmitting module. The transmitting module sends the corresponding ACK/NACK information according to the indication in the uplink feedback information transmission subframe(s).

When the relay station needs to feed back multiple ACK/NACK information in one uplink relay subframe, the relay station can use the bundling feedback mode, i.e., feeding back the AND operation results of the multiple ACK/NACK information, or use the multiplexing feedback mode, i.e., feeding back the multiple ACK/NACK information. The feedback mode is pre-determined between the relay station and the base station, for example, it is pre-determined that the multiplexing feedback mode is used when feeding back multiple ACK/NACK information, or is indicated for the relay station via a higher layer signaling.

Example 4

In the present example 4, a part of the uplink and downlink subframes are configured to be used for the communication between the base station and the relay station.

Since the relay station needs to send information such as broadcast, and paging to the subordinate UE(s) in subframes 0, 1, 5, and 6, the remaining subframes can be configured to be relay subframes. The transmission timing relationship of the corresponding ACK/NACK feedback information of the relay link downlink service transmission can be determined by the already pre-determined uplink feedback information transmission timing relationship between the base station and the relay station. In this example, subframe uplink/downlink configuration 1 is taken as an example (as shown in Table 1).

It is assumed that subframe 8, and subframes 4 and 9 of number n radio frame and number n+1 radio frame are respectively configured to be uplink and downlink relay subframes, as shown in FIG. 7. When the base station sends service data to the relay station in subframe 4 of number n radio frame, the corresponding feedback information ACK/NACK of the service data is fed back according to the feedback timing relationship specified in the existing TDD LTE specification, i.e., it is fed back in uplink relay subframe 8 of number n radio frame. As to the relay link service data in downlink subframe 9, the corresponding feedback information will be fed back in uplink subframe 3 according to the provision of the existing TDD LTE specification. However, in the present example, subframe 3 is an ordinary uplink subframe, and the relay station receives the signals of the subordinate user equipments in subframe 3 and can not send the feedback information ACK/NACK to the base station.

Therefore, as to the transmission of relay link downlink service data in subframe 9 of number n radio frame, the corresponding feedback information ACK/NACK is fed back in uplink relay subframe 8 of number n+1 radio frame. This feedback timing relationship could be pre-determined between the base station and the relay station and the indication of an additional signaling is not needed. The pre-determination here means to specify the timing relationship of the feedback information transmission in a related communication specification. After the base station informs the relay station of the relay subframe configuration information, the relay station determines to transmit, in uplink relay subframe 8 of number n+1 radio frame, the corresponding feedback information ACK/NACK of the downlink relay link service data in subframe 9 of number n radio frame according to this configuration situation and the pre-determined feedback timing relationship.

The feedback transmission process of the relay station is that: after the relay station receives the service data of the base station in downlink relay subframes 4 and 9 of number n radio frame, an uplink feedback information generating module generates the corresponding ACK or NACK information according to the check results of the data, uses the pre-determined feedback information transmission timing relationship between the base station and the relay station to determine that the feedback information transmission subframes is uplink relay subframe 8 of number n and n+1 radio frame respectively, and indicates the same to a transmitting module. In subframe 8 of number n and n+1 radio frames, the transmitting module sends the corresponding ACK/NACK information according to the indication.

When the relay station needs to feed back multiple ACK/NACK information in one uplink relay subframe, the relay station can use the bundling feedback mode, i.e., feeding back the AND operation results of the multiple ACK/NACK information, or uses the multiplexing feedback mode, i.e., feeding back the multiple ACK/NACK information. The feedback information is pre-determined between the relay station and the base station, for example, it is pre-determined that the multiplexing feedback mode is used when feeding back multiple ACK/NACK information; or indicated to the relay station via a higher layer signaling.

Example 5

Figure 1A:
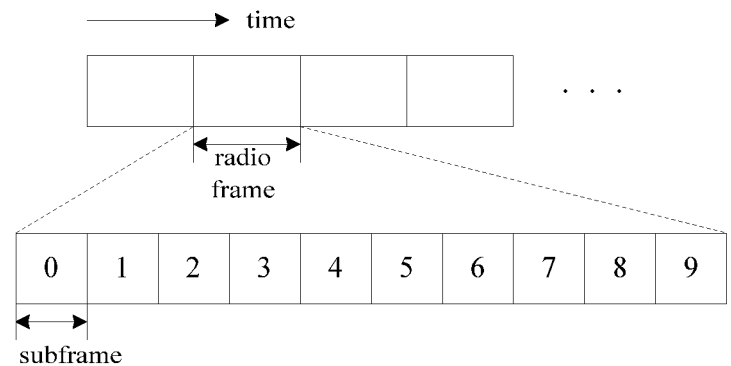
FIG. 1a is a schematic diagram of the frame structure in a TDD system according to the related art.
Figure 1B:
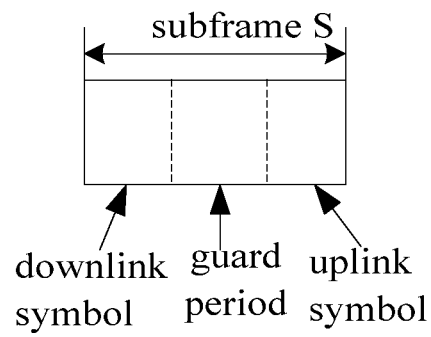
FIG. 1b is a schematic diagram of the special subframe structure in a TDD system according to the related art.

Since the relay station needs to send information such as broadcast, paging, and synchronization to the subordinate UE(s) in subframes 0, 1, 5, and 6, subframes 0, 1, 5, and 6 cannot be used as the relay subframes. However, in subframe uplink/downlink configuration 0, there is no available downlink subframe except of subframes 0, 1, 5, and 6, for the base station sending data to the relay station; and in subframe uplink/downlink configuration 5, there is only one uplink subframe and the relay station needs to receive the data of the subordinate user equipment(s) in this subframe, and therefore, there is no available uplink resources for the relay station sending data to the base station. However, in subframe uplink/downlink configuration 0, the GP portion in special subframe S (subframes 1 and 6) can be used for the base station sending data to the relay station; and in subframe uplink/downlink configuration 5, the GP portion in special subframe S (subframe 1) can be used for the relay station sending data to the base station. The structure of special subframe S is as shown in FIG. 1b.

In the present example 5, the method of the embodiments of the present invention is described by taking subframe uplink/downlink configuration 0 and 5 as examples respectively.

As to subframe uplink/downlink configuration 0, it is assumed that in number n and number n+1 radio frames, the GP portion resources in subframes 1 and 6 are configured to be used for the base station sending data to the relay station and subframes 3 and 8 are configured to be used as uplink relay subframes. As shown in FIG. 8(a), the meanings of DL-B and UL-B are the same as the above described, and only partial symbols in the middle of DL-B are used for the base station sending data to the relay station in this example. As to this relay subframe configuration, the corresponding feedback information of the relay link downlink service data transmission in subframes 1 and 6 of number n radio frame is transmitted in uplink relay subframe 8 of number n radio frame and uplink relay subframe 3 of number n+1 radio frame.

As to subframe uplink/downlink configuration 5, it is assumed that in number n, n+1 and n+2 radio frames, the GP portion resources in subframe 1 are configured to be used for the relay station sending data to the base station and subframes 3, 4 and 7 can be configured as downlink relay subframes. As shown in FIG. 8(b), the meanings of DL-B and UL-B are the same as the above described and only partial symbols in the middle of UL-B are used for the relay station sending data to the base station in this example. In this subframe configuration method, the corresponding feedback information of the relay link downlink service data transmission in subframes 3, 4 and 7 of number n radio frame is transmitted in subframe 1 of number n+1 radio frame.

The feedback transmission process of the relay station is that: after the relay station receives the service data of the base station, an uplink feedback information generating module generates the corresponding ACK or NACK information according to the check results of the data, uses the feedback information transmission timing relationship already pre-determined between the base station and the relay station or indicated by the base station to determine the feedback information transmission subframe number, and indicates the same to a transmitting module. The transmitting module sends the corresponding ACK/NACK information according to the indication in the determined uplink feedback information sending subframe(s).

When the relay station needs to feed back multiple ACK/NACK information in one uplink relay subframe, the relay station can use the bundling feedback mode, i.e., feeding back the AND operation results of the multiple ACK/NACK information, or uses the multiplexing feedback mode, i.e., feeding back the multiple ACK/NACK information. The feedback information is pre-determined between the relay station and the base station, for example, it is pre-determined that the multiplexing feedback mode is used when feeding back multiple ACK/NACK information; or indicated to the relay station via a higher layer signaling.

By the above embodiments, the feedback problem of the corresponding ACK/NACK information of the relay link downlink service data is solved in the TDD LTE-A system including a relay station, the reliability of the downlink communication between the base station and the relay station is ensured, and the transmission of this feedback information will not affect the user equipment.

Apparatus Embodiment 1

Figure 9:
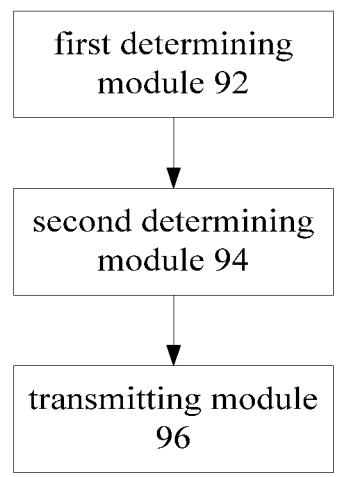
FIG. 9 is a block diagram of the structure of a relay station according to the embodiments of the present invention.

A relay station is provided according to the embodiments of the present invention. FIG. 9 is a block diagram of the structure of a relay station according to the embodiments of the present invention. As shown in FIG. 9, the apparatus comprises: a first determining module 92, a second determining module 94 and a transmitting module 96, which structure will be described in detail hereinafter.

The first determining module 92 is configured to determine timing relationship for transmitting uplink feedback information according to relay subframe configuration; the second determining module 94, connected to the first determining module 92, is configured to determine uplink relay subframe(s) for transmitting the uplink feedback information according to the timing relationship; and the transmitting module 96, connected to the second determining module 94, is configured to transmit the uplink feedback information via the uplink relay subframe(s).

Figure 10:
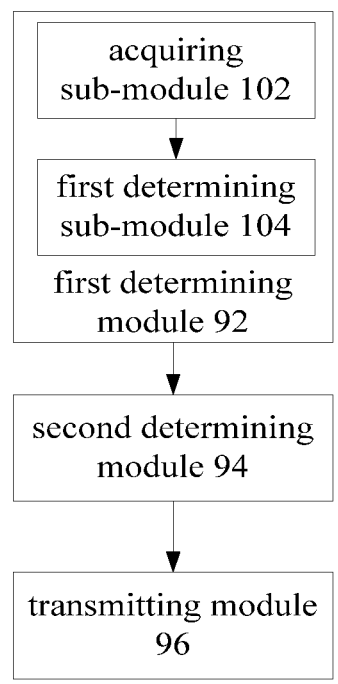
FIG. 10 is block diagram 1 of the detailed structure of the relay station according to the embodiments of the present invention.

FIG. 10 is block diagram 1 of the detailed structure of the relay station according to the embodiments of the present invention, and as shown in FIG. 10, the first determining module 92 can comprise an acquiring sub-module 102 and a first determining sub-module 104, which structure will be described in detail hereinafter.

The acquiring sub-module 102 is configured to acquire the relay subframe configuration; the first determining sub-module 104, connected to the acquiring sub-module 102, is configured to determine the timing relationship from pre-determined correspondence according to the acquired relay subframe configuration, wherein the correspondence is between the relay subframe configuration and the uplink feedback information transmission timing relationship, or the correspondence is between subframe locations of relay link downlink service transmission and uplink feedback information transmission.

Figure 11:
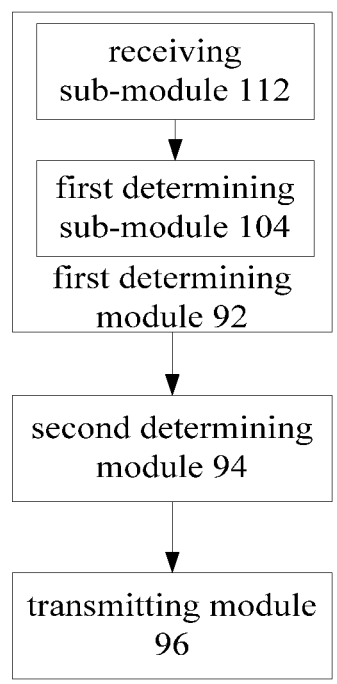
FIG. 11 is block diagram 2 of the detailed structure of the relay station according to the embodiments of the present invention.

FIG. 11 is block diagram 2 of the detailed structure of the relay station according to the embodiments of the present invention, and as shown in FIG. 11, the first determining module 92 can also comprise: a receiving sub-module 112, configured to receive indication information for indicating the timing relationship from a base station; a first determining sub-module 104, connected to the receiving sub-module 112, configured to determine subframe(s) of the uplink feedback information transmission according to the indication signaling acquired from the receiving sub-module 112.

Preferably, the above relay station also comprises: an uplink feedback information generating module, for the relay station generating the corresponding ACK/NACK information (i.e., uplink feedback information) according to the received downlink service data.

Preferably, the above transmitting module 96 is also configured to, in a situation that multiple feedback information of the downlink service needs to be fed back in an uplink relay subframe, send, after having generated the feedback information according to a feedback mode predefined or indicated by a higher layer signaling, the above multiple uplink feedback information by a bundling feedback mode or a multiplexing feedback mode to the base station.

Apparatus Embodiment 2

Figure 12:
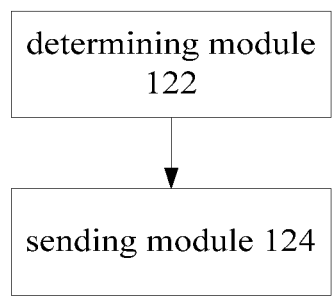
FIG. 12 is a block diagram of the structure of a base station according to the embodiments of the present invention.

A base station is provided according to the embodiments of the present invention. FIG. 12 is a block diagram of the structure of a base station according to the embodiments of the present invention, and as shown in FIG. 12, the base station comprises: a determining module 122 and a sending module 124, which structure will be described in detail hereinafter.

The determining module 122 is configured to determine timing relationship according to relay subframe configuration; and the sending module 124, connected to the determining module 122, is configured to send indication information to a relay station, wherein the indication information is used for indicating the timing relationship.

Preferably, the sending module 124 can send service data to the relay station via downlink relay subframe(s) and to carry the indication information in downlink control information corresponding to the service data.

Preferably, the base station also comprises: a receiving module 126 configured to receive uplink feedback information in the uplink relay subframe(s) determined by the timing relationship.

Preferably, the indication information can be subframe number(s) of the uplink relay subframe(s) for transmitting the uplink feedback information, and can be the offset of the uplink relay subframe(s). The offset module: the offset of a feedback information transmission subframe relative to a relay link downlink service data transmission subframe, wherein the offset is the offset relative to all the subframes, or the offset of a feedback information transmission subframe relative to the first uplink relay subframe subsequent to the relay link downlink service data transmission subframe, wherein the offset is the offset relative to the uplink relay subframe.

In summary, in the TDD LTE-A system, by the above embodiments of the present invention, when it is caused by the configuration of the relay subframe that the relay link uplink feedback information can not be transmitted according to the ACK/NACK feedback timing relationship specified in the TDD LTE Release 8 specification, a new subframe is determined in the uplink relay subframe to be the transmission subframe(s) of the relay link uplink feedback information, therefore, the loss of the relay link uplink feedback information is avoided and the reliability of the relay link downlink service transmission is ensured.

Obviously, those skilled in the art shall understand that individual modules or individual steps of the present invention can be implemented with general computing devices, they may be integrated in a single computing device or distributed in network formed by a plurality of computing devices, optionally, they may be implemented by using program codes executable by computing devices, thus they may be stored in memory devices for execution by the computing devices, or implemented by making them into integrated circuit module respectively, or by making several modules or steps in to a single IC. Thus, the present invention is not limited to any particular combination of hardware and software.

Above description is only to illustrate the preferred embodiments but not to limit the present invention. Various alterations and changes to the present invention are apparent to those skilled in the art. The scope defined in claims shall comprise any modification, equivalent substitution and improvement within the spirit and principle of the present invention.

What is claimed is:

1. A method for transmitting relay link uplink acknowledgment/negative acknowledgment feedback information, comprising:
   determining a timing relationship for transmitting the uplink feedback information according to a relay subframe configuration; and
   a relay station determining an uplink relay subframe for transmitting the uplink feedback information according to the timing relationship, and transmitting the uplink feedback information via the uplink relay subframe,
   wherein the step of determining the timing relationship for transmitting the uplink feedback information according to the relay subframe configuration comprises:
   the relay station acquiring the relay subframe configuration and determining, according to the acquired relay subframe configuration, the timing relationship from predetermined correspondence, wherein the correspondence is between the relay subframe configuration and uplink feedback information transmission timing relationship, or the correspondence is between subframe locations of relay link downlink service transmission and corresponding uplink feedback information transmission; or
   a base station determining the timing relationship according to the relay subframe configuration, and sending indication information for indicating the timing relationship to the relay station;
   wherein as to subframe uplink/downlink configuration 1, the timing relation is determined to be that:
      if only subframe 3 is configured to be an uplink relay subframe, the corresponding feedback information of the relay link downlink service data transmission in subframe 4 of number n radio frame will be transmitted in uplink relay subframe 3 of number n+1 radio frame; and
      if only subframe 8 is configured to be an uplink relay subframe, the corresponding feedback information of the relay link downlink service data transmission in subframe 9 of number n radio frame will be transmitted in uplink relay subframe 8 of number n+1 radio frame; or
   wherein as to subframe uplink/downlink configuration 2, the timing relation is determined to be that:
      if only subframe 2 is configured to be an uplink relay subframe, the corresponding feedback information of the relay link downlink service data transmission in subframe 3 of number n radio frame will be transmitted in uplink relay subframe 2 of number n+1 radio frame, and the corresponding feedback information of the relay link downlink service data transmission in subframe 9 of number n radio frame will be transmitted in uplink relay subframe 2 of number n+2 radio frame; and if only subframe 7 is configured to be an uplink relay subframe, the corresponding feedback information of the relay link downlink service data transmission in uplink relay subframe 4 and/or 8 of number n radio frame will be transmitted in uplink relay subframe 7 of number n+1 radio frame; or wherein as to subframe uplink/downlink configuration 3, the timing relation is determined to be that:

if subframe 3 is configured to be an uplink relay subframe, the corresponding feedback information of the relay link downlink service data transmission in subframe 9 of number n radio frame will be transmitted in uplink relay subframe 3 of number n+1 radio frame; or wherein as to subframe uplink/downlink configuration 4, the timing relation is determined to be that:

if subframe 3 is configured to be an uplink relay subframe, the corresponding feedback information of the relay link downlink service data transmission in subframe 4 of number n radio frame will be transmitted in uplink relay subframe 3 of number n+1 radio frame.

2. The method according to claim 1, wherein the indication information at least comprises one of the following:

subframe number of the uplink relay subframe and offset of the uplink relay subframe.

3. The method according to claim 2, wherein, before determining the timing relationship for transmitting the uplink feedback information according to the relay subframe configuration, the method further comprises:

determining whether transmission of relay link uplink feedback information can use the timing relationship, wherein the timing relationship is the timing relationship of the uplink feedback information defined in TDD LTE Release 8 specification under the relay subframe configuration;

if it is determined to be yes, transmitting the uplink feedback information according to the timing relationship of the uplink feedback information transmission defined in the TDD LTE Release 8 specification; and if it is determined to be no, determining the timing relationship for transmitting the uplink feedback information according to the relay subframe configuration.

4. The method according to claim 1, wherein, before determining the timing relationship for transmitting the uplink feedback information according to the relay subframe configuration, the method further comprises:

determining whether transmission of relay link uplink feedback information can use the timing relationship, wherein the timing relationship is the timing relationship of the uplink feedback information defined in TDD LTE Release 8 specification under the relay subframe configuration;

if it is determined to be yes, transmitting the uplink feedback information according to the timing relationship of the uplink feedback information transmission defined in the TDD LTE Release 8 specification; and if it is determined to be no, determining the timing relationship for transmitting the uplink feedback information according to the relay subframe configuration.

5. The method according to claim 1, wherein the step of the relay station transmitting the uplink feedback information via the uplink relay subframe comprises:

if resources in a special subframe are used for transmitting downlink service to the relay station by a base station, the relay station transmitting uplink feedback information of the downlink service via the uplink relay subframe subsequent to the special subframe.

6. The method according to claim 1, wherein the step of the relay station transmitting the uplink feedback information via the uplink relay subframe comprises:

if only resources in the special subframe are used by the relay station to transmit relay link uplink data to a base station, the relay station transmitting the uplink feedback information via the special subframe.

7. A relay station, comprising:

a first determining module, configured to determine a timing relationship for transmitting uplink feedback information according to a relay subframe configuration;

a second determining module, configured to determine an uplink relay subframe for transmitting the uplink feedback information according to the timing relationship; and a transmitting module, configured to transmit the uplink feedback information via the uplink relay subframe, wherein the first determining module comprises an acquiring sub-module and a first determining sub-module, wherein the acquiring sub-module is configured to acquire the relay subframe configuration;

the first determining sub-module is configured to determine the timing relationship from pre-determined correspondence according to the acquired relay subframe configuration, wherein the correspondence is between the relay subframe configuration and the uplink feedback information transmission timing relationship, or the correspondence is between subframe locations of relay link downlink service transmission and corresponding uplink feedback information transmission;

wherein as to subframe uplink/downlink configuration 1, the timing relation is determined to be that:

if only subframe 3 is configured to be an uplink relay subframe, the corresponding feedback information of the relay link downlink service data transmission in subframe 4 of number n radio frame will be transmitted in uplink relay subframe 3 of number n+1 radio frame; and if only subframe 8 is configured to be an uplink relay subframe, the corresponding feedback information of the relay link downlink service data transmission in subframe 9 of number n radio frame will be transmitted in uplink relay subframe 8 of number n+1 radio frame; or wherein as to subframe uplink/downlink configuration 2, the timing relation is determined to be that:

if only subframe 2 is configured to be an uplink relay subframe, the corresponding feedback information of the relay link downlink service data transmission in subframe 3 of number n radio frame will be transmitted in uplink relay subframe 2 of number n+1 radio frame, and the corresponding feedback information of the relay link downlink service data transmission in subframe 9 of number n radio frame will be transmitted in uplink relay subframe 2 of number n+2 radio frame; and if only subframe 7 is configured to be an uplink relay subframe, the corresponding feedback information of the relay link downlink service data transmission in uplink relay subframe 4 and/or 8 of number n radio frame will be transmitted in uplink relay subframe 7 of number n+1 radio frame; or wherein as to subframe uplink/downlink configuration 3, the timing relation is determined to be that:

if subframe 3 is configured to be an uplink relay subframe, the corresponding feedback information of the relay link downlink service data transmission in subframe 9 of number n radio frame will be transmitted in uplink relay subframe 3 of number n+1 radio frame; or wherein as to subframe uplink/downlink configuration 4, the timing relation is determined to be that:

if subframe 3 is configured to be an uplink relay subframe, the corresponding feedback information of the relay link downlink service data transmission in subframe 4 of number n radio frame will be transmitted in uplink relay subframe 3 of number n+1 radio frame.

8. The relay station according to claim 7, wherein the first determining module further comprises:

a receiving sub-module, configured to receive indication information for indicating the timing relationship from a base station.

9. A base station, comprising:

a determining module, configured to determine a timing relationship according to a relay subframe configuration;

a sending module, configured to send indication information for indicating the timing relationship to the relay station; and a receiving module, configured to receive uplink feedback information in the uplink relay subframe determined by the timing relationship;

wherein as to subframe uplink/downlink configuration 1, the timing relation is determined to be that:

if only subframe 3 is configured to be an uplink relay subframe, the corresponding feedback information of the relay link downlink service data transmission in subframe 4 of number n radio frame will be transmitted in uplink relay subframe 3 of number n+1 radio frame; and if only subframe 8 is configured to be an uplink relay subframe, the corresponding feedback information of the relay link downlink service data transmission in subframe 9 of number n radio frame will be transmitted in uplink relay subframe 8 of number n+1 radio frame; or wherein as to subframe uplink/downlink configuration 2, the timing relation is determined to be that:

if only subframe 2 is configured to be an uplink relay subframe, the corresponding feedback information of the relay link downlink service data transmission in subframe 3 of number n radio frame will be transmitted in uplink relay subframe 2 of number n+1 radio frame, and the corresponding feedback information of the relay link downlink service data transmission in subframe 9 of number n radio frame will be transmitted in uplink relay subframe 2 of number n+2 radio frame; and if only subframe 7 is configured to be an uplink relay subframe, the corresponding feedback information of the relay link downlink service data transmission in uplink relay subframe 4 and/or 8 of number n radio frame will be transmitted in uplink relay subframe 7 of number n+1 radio frame; or wherein as to subframe uplink/downlink configuration 3, the timing relation is determined to be that:

if subframe 3 is configured to be an uplink relay subframe, the corresponding feedback information of the relay link downlink service data transmission in subframe 9 of number n radio frame will be transmitted in uplink relay subframe 3 of number n+1 radio frame; or wherein as to subframe uplink/downlink configuration 4, the timing relation is determined to be that:

if subframe 3 is configured to be an uplink relay subframe, the corresponding feedback information of the relay link downlink service data transmission in subframe 4 of number n radio frame will be transmitted in uplink relay subframe 3 of number n+1 radio frame.

10. The base station according to claim 9, wherein, the sending module is further configured to send service data to the relay station via a downlink relay subframe and to carry the indication information in downlink control information corresponding to the service data.

\* \* \* \* \*